United States Patent [19]
Moroto et al.

[11] Patent Number: 5,433,282
[45] Date of Patent: Jul. 18, 1995

[54] HYBRID VEHICLE POWERED BY AN INTERNAL COMBUSTION ENGINE AND AN ELECTRIC MOTOR

[75] Inventors: Shuzo Moroto; Mutsumi Kawamoto; Kozo Yamaguchi; Shigeo Tuzuki; Yoshinori Miyaishi, all of Aichi, Japan

[73] Assignee: Kabushikikaisha Equos Research, Japan

[21] Appl. No.: 60,010

[22] Filed: May 12, 1993

[30] Foreign Application Priority Data

May 19, 1992 [JP] Japan ................... 4-125995

[51] Int. Cl.$^6$ ................................. B60K 6/02
[52] U.S. Cl. .................... 180/65.2; 180/65.6
[58] Field of Search ............ 180/65.2, 65.7, 65.6, 180/338; 123/DIG. 8

[56] References Cited

U.S. PATENT DOCUMENTS

| | | | |
|---|---|---|---|
| 2,506,809 | 5/1950 | Nims ................ | 180/65.2 X |
| 3,732,751 | 5/1973 | Berman et al. ........ | 180/65.2 X |
| 3,861,484 | 1/1975 | Joslin .............. | 180/65.2 |
| 3,923,115 | 12/1975 | Helling ............. | 180/65.2 |
| 4,165,795 | 8/1979 | Lynch et al. ......... | 180/65.2 |
| 4,233,858 | 11/1980 | Rowlett ............. | 180/65.2 X |
| 4,309,620 | 1/1982 | Bock ................ | 180/65.2 X |
| 4,400,997 | 8/1983 | Fiala ............... | 180/65.2 X |
| 4,533,011 | 8/1985 | Heidemeyer et al. ... | 180/65.2 |

FOREIGN PATENT DOCUMENTS

| | | | |
|---|---|---|---|
| 2441583 | 3/1976 | Germany ............ | 180/65.7 |
| 3246230 | 6/1984 | Germany ............ | 180/65.2 |

Primary Examiner—Brian L. Johnson
Attorney, Agent, or Firm—Lorusso & Loud

[57] ABSTRACT

A hybrid vehicle has an internal combustion engine, an electric motor, a transmission unit and driving wheels. The transmission unit includes a planetary gear unit and a one-way clutch, so that each output rotary speed of the internal combustion engine and the electric motor is changed. The planetary gear unit includes three elements: a ring gear, a sun gear and a carrier having at least one pinion. When the vehicle is in an under-drive cruising state, the first element of the planetary gear unit, which does not rotate, is connected to the output shaft of the internal combustion engine, the second element of the planetary gear unit, which rotates at a relatively high speed, is connected to the output shaft of the electric motor, and the third element of the planetary gear unit, which rotates at relatively lower speed, is connected to the output shaft of the transmission unit. The one-way clutch is provided between the output shaft of the internal combustion engine and a case housing the transmission unit to allow the output shaft of the internal combustion engine to rotate in one direction only.

14 Claims, 11 Drawing Sheets

HYBRID VEHICLE POWERED BY AN INTERNAL COMBUSTION ENGINE AND AN ELECTRIC MOTOR

BACKGROUND OF THE INVENTION

1. Field of the Invention

This invention is broadly concerned with a so-called hybrid vehicle which has a combined power source consisting of an internal-combustion engine, such as a gasoline or diesel engine, and an electric motor driven by electrical energy stored in a battery.

2. Description of the Related Art

Generally, in the conventional vehicle, the rotary power of an internal combustion engine, using gasoline for fuel, is transmitted to front and/or rear driving wheels through an automatic or a manual transmission unit. The internal combustion engine burns a compressed gas mixture of air and gasoline and outputs the energy of combustion as the engine torque. Therefore, the conventional vehicle has noise problems caused by combustion and environmental pollution problems caused by exhaust gas.

In consideration of these problems, various electric vehicles, whose energy source is electricity instead of gasoline, have been developed. Electric vehicles known to the public carry on board a battery which stores electricity as an energy source and an electric motor for driving the wheels. Therefore, the running of the electric vehicle is not accompanied by noise or by exhaust gas.

However, at present, the capacity of the battery is not necessarily sufficient and, as a result, the range of the car tends to be shorter than demanded. When it is necessary to secure sufficient range using the electric motor for driving the wheels, use of a big battery which is inconvenient from the viewpoints of weight and space is inevitable. Also, because of restriction on the size of the electric motor, the driving force obtained with the electric motor is weaker than that of the vehicle using an internal combustion engine. Therefore, a rapid start, running under heavy load, and high-speed running are difficult to be realized.

Based on the problems mentioned above, so-called hybrid vehicles, which use both an internal combustion engine and an electric motor, have been proposed. The hybrid vehicles include, for example: (1) a series type hybrid vehicle wherein electric energy is generated by using a generator driven by an internal combustion engine and an electric motor utilizes this electric energy as vehicle driving power (see Japanese Patent Application Laid-open No. 62-104403); and (2) a parallel type hybrid vehicle which uses both the internal combustion engine and the electric motor, arranged in parallel, as drive sources (see Japanese Patent Application Laid-open No. 59-63901 and U.S. Pat. No. 4,533,011).

These latter hybrid vehicles, which have been known to the public, use the electric motor as the main source of driving power during low or middle speed running in cities and use the internal combustion engine which has more power during high speed running in the suburbs. The truth of the matter is that the above-mentioned conventional hybrid vehicles cannot run very fast during driving in cities. In the suburbs, it can be said that efficient running which takes advantage of both the internal combustion engine and the electric motor has not been well considered.

The purpose of this invention is to solve the various problems which exist in the conventional hybrid vehicles and not only to prevent noise and exhaust gas, but also to generate sufficiently strong driving force for city travel. For suburban driving, it provides a hybrid vehicle which can effectively use both the internal combustion engine and the electric motor in consideration of energy efficiency.

SUMMARY OF THE INVENTION

A hybrid vehicle according to the present invention has an internal combustion engine, an electric motor, a transmission unit consisting of a planetary gear unit and a one-way clutch, and driving wheels receiving output from the transmission unit.

The planetary gear unit has a ring gear, a carrier with at least one pinion gear and a sun gear as three components. Because revolution of the output shaft of the engine is stopped, in a so-called under-drive condition, the rotary torque of an output shaft extending from the electric motor is reduced in speed by the planetary gear unit and communicated to an output shaft connected to the driving wheels. The output shaft of the engine is connected to one of the three gear components of the planetary gear unit whose revolution is restricted, the output shaft of the electric motor is connected to the high-speed rotating gear which is the second component and an output shaft of the transmission unit is connected to the low-speed rotating gear which is the third component of the planetary gear unit.

The one-way clutch is installed between the output shaft of the engine and the case and it allows the output shaft extending from the engine to rotate in one direction while preventing revolution in the opposite direction.

Accordingly, the hybrid vehicle based on the present invention is made to be run by (1) the combination of the electric motor and the internal combustion engine, (2) the internal combustion engine or (3) the electric motor. When the vehicle runs on the electric motor, noise and exhaust gas are prevented as expected and, through the operation of the one-way clutch, the transmission unit is shifted to the under-drive condition. Therefore, the hybrid vehicle can obtain sufficient driving force. Also, when the vehicle runs on the combination of the engine and the electric motor, torque generated by the engine and the electric motor multiply contribute to the running of the vehicle and, as a result, the internal combustion engine and the electric motor can be used with high energy efficiency in the hybrid vehicle.

DETAILED DESCRIPTION OF THE PREFERRED EMBODIMENT(S)

The preferred embodiments of the present invention will now be described with reference to the drawings. Incidentally, in the explanation of each of the following embodiments, each shaft is shown as being directly connected with the internal combustion engine and electric motor for sake of the convenience of the drawings. Thus, it is supposed that the rotary speeds of the engine and the electric motor are the same as those of the shafts connected to them.

Figure 1:
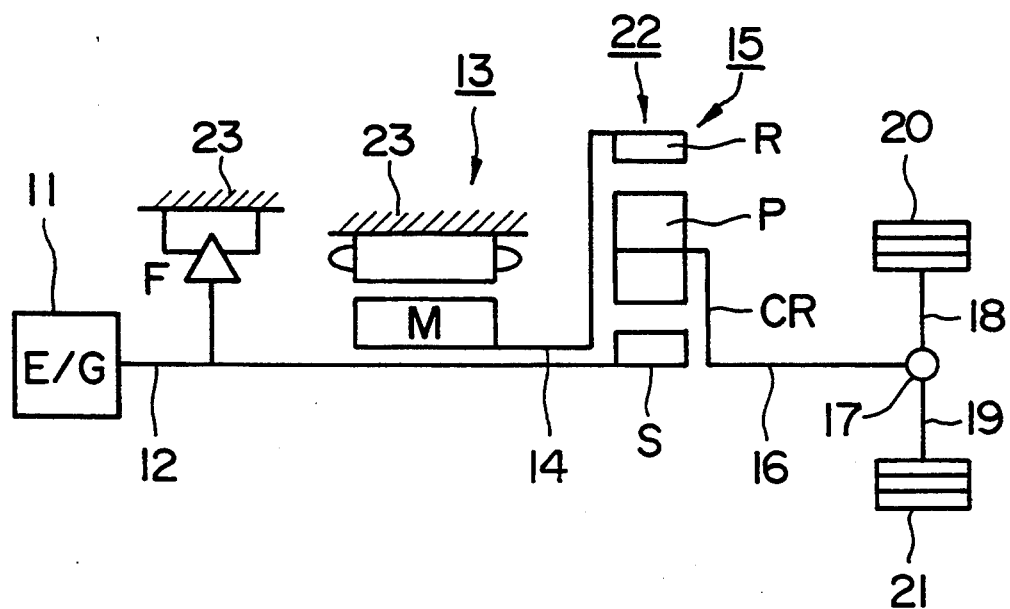
FIG. 1 is a diagrammatic view of the entire structure according to a first embodiment.

FIG. 1 illustrates a first embodiment of the present invention, wherein 11 is an internal combustion engine; 12 is an output shaft of the engine 11; 13 is an electric motor which has a stator and a rotor therein and whose energy source is a battery, not shown in the drawing; 14 is an output shaft of the electric motor 13; 15 is a transmission unit which changes the rotary speed received from the engine 11 and the electric motor 13; 16 is an output shaft of the transmission unit 15; and 17 is a differential unit which differentiates revolution of the output shaft 16.

Electric motor 13 is composed of the rotor, which is connected to and rotates together with the output shaft 14, and the stator secured to the drive unit housing or case 23. Reference numerals 18 and 19 in the drawing respectively indicate a driving shaft for communicating differential rotation from the differential unit 17 to the driving wheels 20 and 21. In this invention, the engine 11 and the electric motor 13 are arranged so that both of them drive the drive wheels 20 and 21. The drive wheels 20 and 21 can be either front or rear.

The transmission unit 15 is composed of the planetary gear unit 22 of single planetary type in general use and a one-way clutch F. The planetary gear unit 22 includes the carrier CR, which is a unitary ring gear R and pinion P, and a sun gear S. The sun gear S is connected to the output shaft 12 of the internal combustion engine 11 and, similarly, the ring gear R is connected to the output shaft 14 of the motor 13. The carrier CR which is the last component of the planetary gear unit 22 is connected to the output shaft 16 which is connected to the driving wheels 20, 21 through the differential unit 17.

The one-way clutch F is arranged between the sun gear S, which is connected to the engine 11, and the driving unit case 23. When the engine 11 turns in one direction, the one-way clutch F does not engage, but does engage to prevent rotation of sun gear S in the opposite direction.

Figure 2:
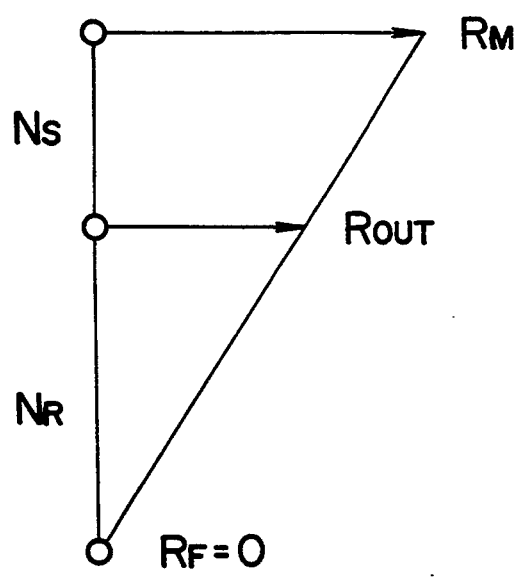
FIG. 2 and FIG. 3 are graphical representations of an interrelationship between number of revolutions of the internal combustion engine and number of revolutions of the electric motor.

In FIG. 2, $N_S$ represents the number of the cogs of the sun gear S, and $N_R$ represents the number of the cogs of the ring gear R. $R_M$ is the rotary speed of the electric motor 13, as detected at the output shaft 14, and $R_{OUT}$ is the rotary speed, as detected at the output shaft 16. $R_F$ is the rotary speed of the one-way clutch F. Incidentally, a value 0 (zero) for the rotary speed of the one-way clutch F means that the clutch is engaged.

Therefore, when the hybrid vehicle based on the present invention runs by using only the electric motor 13, electric current is supplied to the electric motor 13 but the engine 11 is not driven. In other words, as is shown in FIG. 2, running in the under-drive condition has the one-way clutch F engaged and the revolution of the electric motor 13 is communicated to output shaft 16 through carrier CR. In this manner, a rotary speed preferred for instant start of the vehicle is transmitted to the drive wheels 20 and 21.

As has been mentioned above, the hybrid vehicle of the present invention enables instant start without generating noise and exhaust gas when running in cities.

Figure 3:
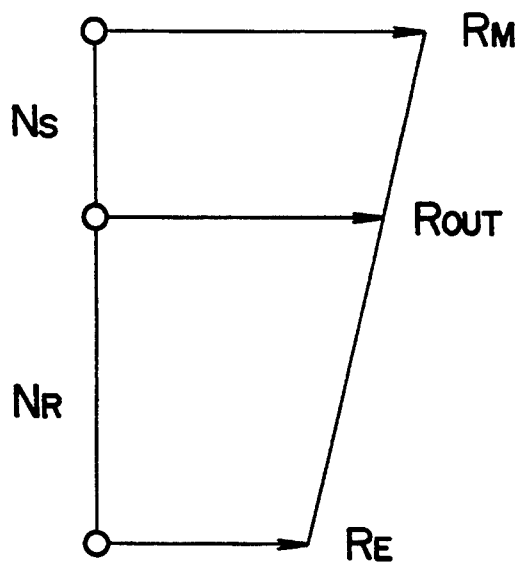

When the hybrid vehicle runs using both the engine 11 and the electric motor 13, the interrelationship between rotary speeds shown in FIG. 3 can be obtained, wherein the one-way clutch F remains engaged. Incidentally, in FIG. 3, $R_M$ is the rotary speed of the electric motor 13, $R_{OUT}$ is the rotary speed of the output shaft 16, and $R_E$ is the rotary speed of the engine 11, as detected at the output shaft 12.

The output shaft torque $T_{OUT}$ is the sum of the motor torque $T_M$ generated by the electric motor 13 and the engine torque $T_E$ generated by the engine 11 as expressed below.

$$T_{OUT} = T_M + T_E$$

$$N_S * T_M = N_R * T_E$$

Figure 4:
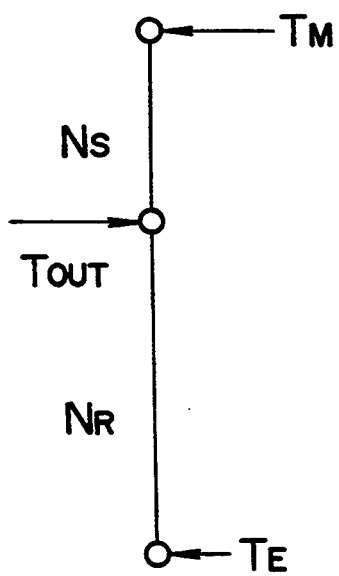
FIG. 4 is a graph depicting an interrelationship between torque of the internal combustion engine and the torque of the electric motor.

Referring to FIGS. 3 and 4, when the motor torque $T_M$, the engine torque $T_E$, the motor rotary speed $R_M$, and the engine rotary speed $R_E$ are set properly, the expected output shaft rotary speed $R_{OUT}$ and the output shaft torque $T_{OUT}$ are realized. Hence, the engine 11 can drive at maximum efficiency by maintaining suitable engine torque $T_E$ and engine rotary speed $R_E$.

Figure 5:
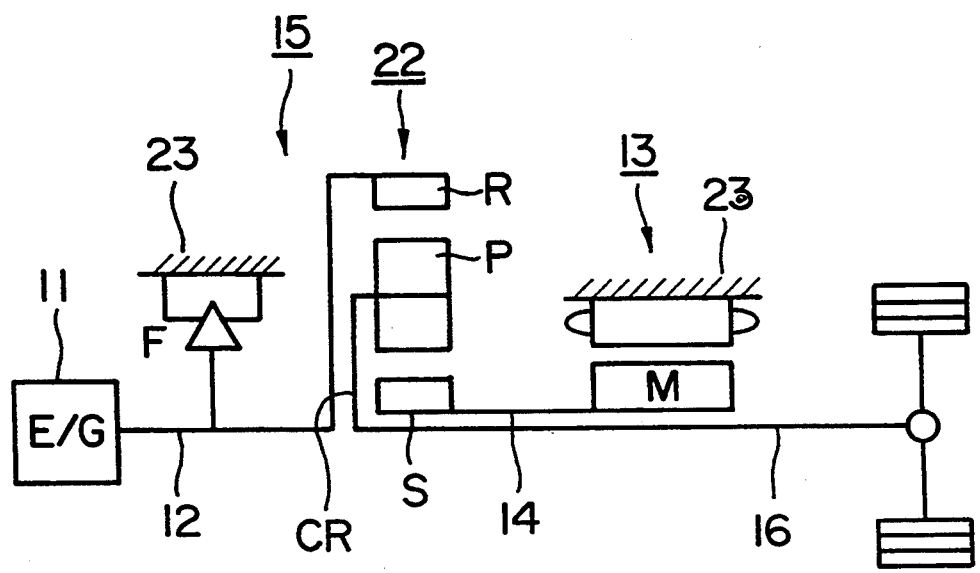
FIG. 5 is a diagrammatic view of the overall structure according to a second embodiment.

Next, a second embodiment of this invention will be explained below with reference to FIG. 5.

Incidentally, in the description of the following embodiment, the same reference numerals will be used to designate the same or similar components as those in the first embodiment, so that descriptions will be omitted or simplified.

In this second embodiment, the ring gear R is connected to the output shaft 12 of the engine 11 and the sun gear S is connected to the output shaft 14 of the motor 13. This arrangement differs from that in the above-described first embodiment, The carrier CR, which is the last component of the planetary gear unit 22, is connected to the output shaft 16, as in the case of the first embodiment. The one-way clutch F is installed between the ring gear R connected with the engine 11 and the driving unit case 23.

Accordingly, when the engine 11 rotates in one direction, the one-way clutch F does not engage, but rotation of the ring gear R in the opposite direction is prevented by the one-way clutch F engaging the ring gear R.

In this second embodiment, the same effects provided by the first embodiment described above and the so-called under-drive cruising of the hybrid vehicle can be achieved.

Figure 6:
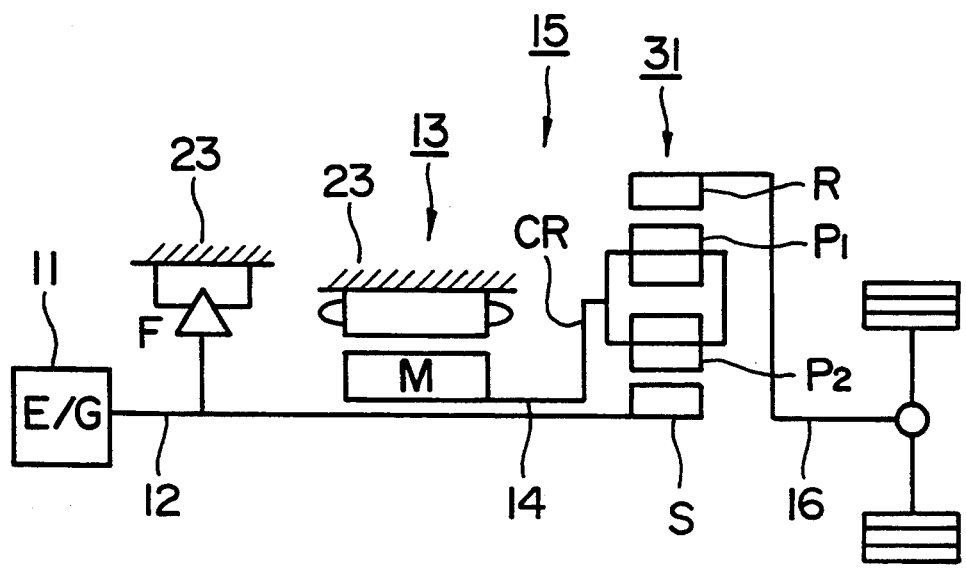
FIG. 6 is a diagrammatic view of the overall structure according to a third embodiment.

A third embodiment of this invention will be explained below with reference to FIG. 6.

In the description of the following embodiment, the same reference numerals will be used to designate the same or similar components as those of the first embodiment, so that descriptions will be omitted or simplified.

The transmission 15 in this third embodiment is a so-called double-planetary type, wherein the carrier CR is provided with 2 pinion gears, that is, the sun gear S is connected to the output shaft 12 of the engine 11 and the carrier CR is connected to the output shaft 14 of the electric motor 13. The ring gear R, which is the last component of the planetary gear unit 22 in this third embodiment, is connected with the output shaft 16. The one-way clutch F is installed between the sun gear S, connected with the engine 11, and the driving unit case 23.

Accordingly, when the engine 11 rotates in one direction, the one-way clutch F does not engage, but rotation of the sun gear S in the opposite direction is prevented by engagement of the one-way clutch F.

In this third embodiment, the same effects as in the embodiments mentioned above and the under-drive cruising of the hybrid vehicle can be achieved.

Figure 7:
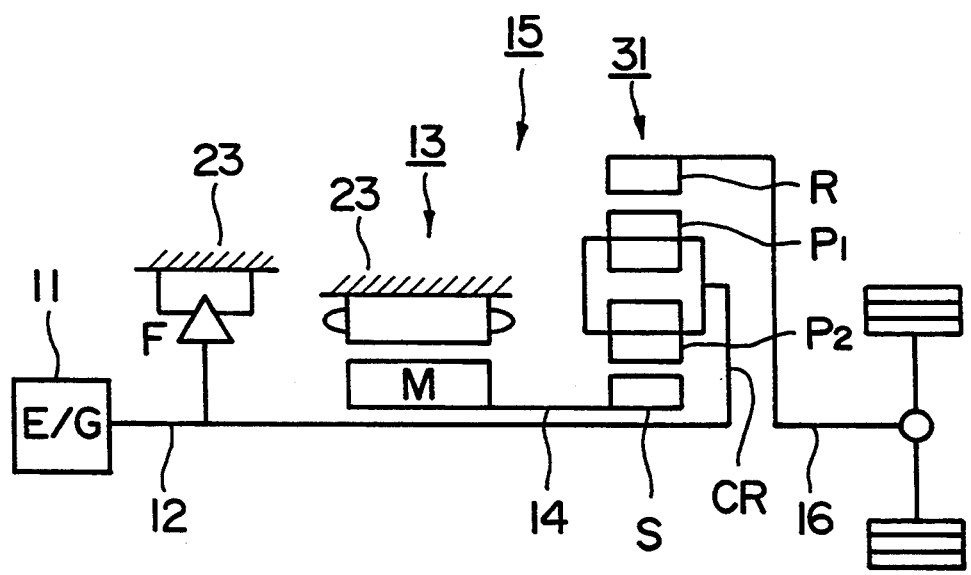
FIG. 7 is a diagrammatic view of the overall structure according to a fourth embodiment.

A fourth embodiment according to the present invention will hereunder be explained with reference to FIG. 7. However, in the description of the following embodiment, the same reference numerals will be used to designate the same or similar components as those in the third embodiment, so that descriptions will be omitted or simplified.

The transmission 15 in this fourth embodiment is also a so-called double-planetary type, as is that of the third embodiment, wherein the carrier CR is provided with 2 pinion gears. In this embodiment, the carrier CR is connected to the output shaft 12 of the engine 11 and the sun gear S is connected to the output shaft 14 of the electric motor 13. The ring gear R, which is the last component of the planetary gear unit 22 of this embodiment, is also connected with the output shaft 16 as in the third embodiment. The one-way clutch F is installed between the carrier CR, connected with the engine 11, and the driving unit case 23.

Hence, when the engine 11 rotates in one direction, the one-way clutch F does not engage, but when the carrier CR is about to rotate in the opposite direction, the one-way clutch F engages.

The same effects as in the embodiments mentioned above and the under-drive cruising of the hybrid vehicle can also be realized in this fourth embodiment.

Figure 8:
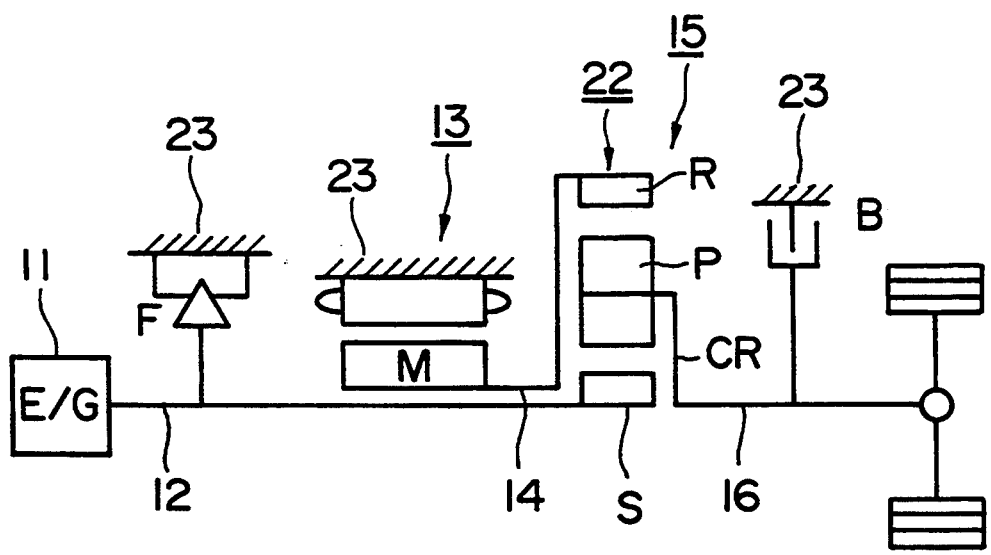
FIG. 8 is a diagrammatic view of the overall structure according to a fifth embodiment.

In FIG. 8 which shows a fifth embodiment of the present invention, there are illustrated at 11 an internal combustion engine; at 12 an output shaft of the engine 11; at 13 an electric motor which has a stator and a rotor therein and whose energy source is electricity from a battery (not shown in the drawing); at 14 an output shaft of the electric motor 13; at 15 a transmission unit which changes the rotary speed of the output of the engine 11 and the electric motor 13; at 16 an output shaft of the transmission unit 15; and at B a brake device secured to the driving unit case 23 so as to stop revolution of the output shaft 16 of the transmission unit 15. It will be observed in the drawing that the overall structure of this embodiment is similar to that in the first embodiment with the exception of the brake device B.

Figure 9:
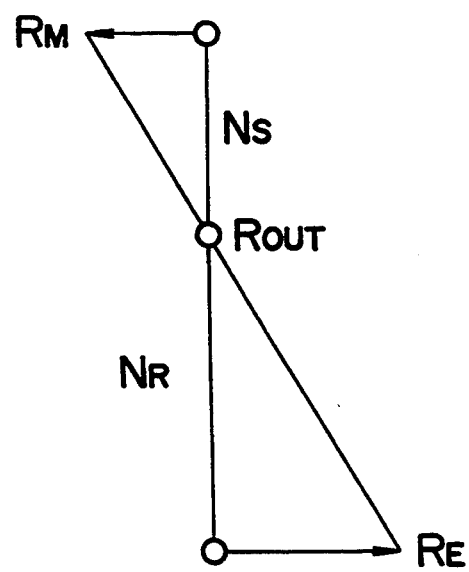
FIG. 9 is a graphical representation of an interrelationship between the rotary speed of the internal combustion engine and the rotary speed of the electric motor in the fifth embodiment.

Accordingly, the same effects as achieved with the embodiments mentioned above and the under-drive cruising of the hybrid vehicle can be obtained in this fifth embodiment. However, as shown in FIG. 9, when the brake device B is engaged, the direction of revolution of the internal combustion engine 11 and that of the output shaft 12 are opposite to that of the electric motor 13 because of the transmission unit 15. Hence, the engine 11 can be started up with the electric motor 13 without using a starter generally provided in vehicles. The engine 11 can reverse rotate the electric motor 13 to generate electric power which will be preferably stored in the battery.

Incidentally, the brake device B may be replaced with a parking brake or a foot-brake system.

A sixth embodiment of the present invention will be explained with reference to FIG. 10 and Table 1.

Figure 10:
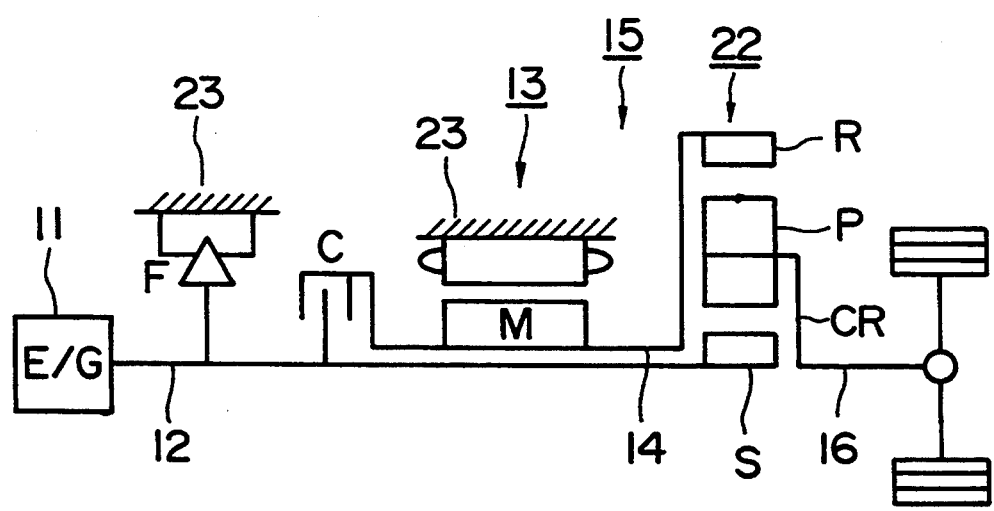
FIG. 10 is a diagrammatic view of the overall structure according to a sixth embodiment.

In FIG. 10 for the sixth embodiment of the present invention, there are illustrated at 11 an internal combustion engine; at 12 an output shaft of the engine 11; at 13 an electric motor which has a stator and a rotor therein and whose energy source is electricity stored in a battery (not shown in the drawing); at 14 an output shaft of the electric motor 13: at 15 a transmission unit which changes the rotary speed of the engine 11 and the electric motor 13; at 16 an output shaft of the transmission unit 15; and at C a clutch device provided between the sun gear S and the ring gear R. It will be observed from the drawing that the overall structure of this embodiment is similar to that of the first embodiment with the exception of the clutch device C.

Accordingly, the same effects obtained with the embodiments described above and the under-drive cruising of the hybrid vehicle can be obtained in this sixth embodiment. However, as shown in Table 1, when the clutch device C is released to move the vehicle by means of the electric motor 13 (as the 1st gear drive), the one-way clutch F engages so as to move the vehicle in the under-drive cruising mode. While, if the clutch device C is activated, while driving with both the electric motor 13 and the engine 11 (as the 2nd gear drive), the one-way clutch F is disengaged and the revolution of the electric motor 13 and the engine 11 is directly transmitted to the output shaft 16.

TABLE 1

|  | CLUTCH C | ONE-WAY CLUTCH F |
|---|---|---|
| 1ST GEAR DRIVE | INACTIVE | ACTIVE |
| 2ND GEAR DRIVE | ACTIVE | INACTIVE |

It will also be noted that when the vehicle is powered by the electric motor 13, the engine 11 can be started up by means of the clutch C. The clutch C may be utilized to prevent the vehicle from rolling backward on an uphill road.

Figure 11:
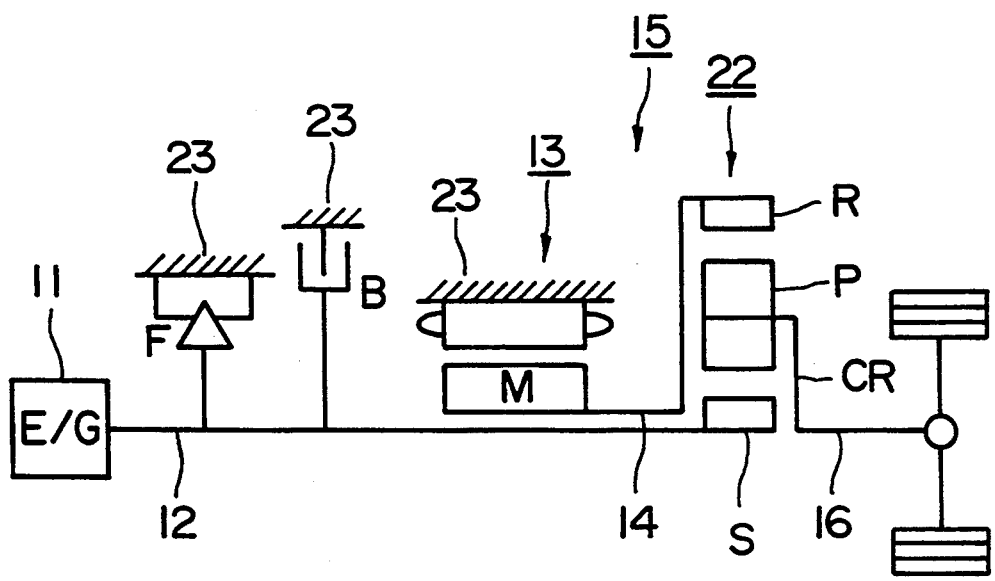
FIG. 11 is a diagrammatic view of the overall structure according to a seventh embodiment.
Figure 12:
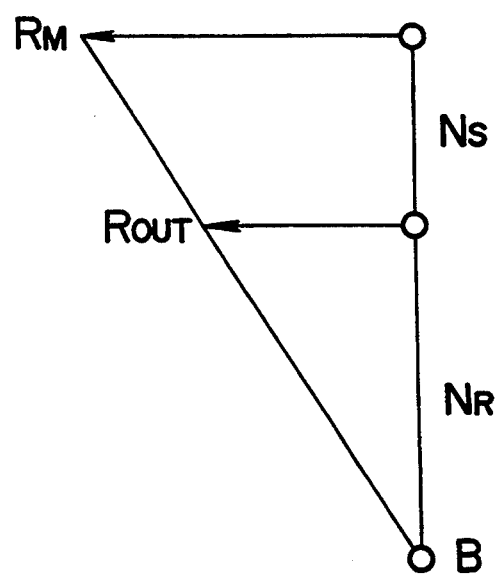
FIG. 12 is a graphical representation of an interrelationship between the rotary speed of the internal combustion engine and the rotary speed of the electric motor in the seventh embodiment.

A seventh embodiment according to the present invention will be explained with reference to FIGS. 11 and 12.

The overall structure in this embodiment is similar to that of the first embodiment except a brake device B is provided between the sun gear S and the driving unit case 23, so that the same effects obtained with the embodiments mentioned above and the under-drive cruising of the hybrid vehicle can also be achieved in this seventh embodiment.

This embodiment has the further merit that, if the brake device B is operated while the vehicle is moved by means of the electric motor 13, it can be utilized to obtain reaction force for the electric motor 13. Reversing of the vehicle can be achieved by activating the brake device B and rotating the electric motor 13 in an opposite direction. These operations may also be obtained by utilizing the inertial force of the engine 11 but this expedient is inferior to the result obtained by utilization of the brake device B.

Figure 13:
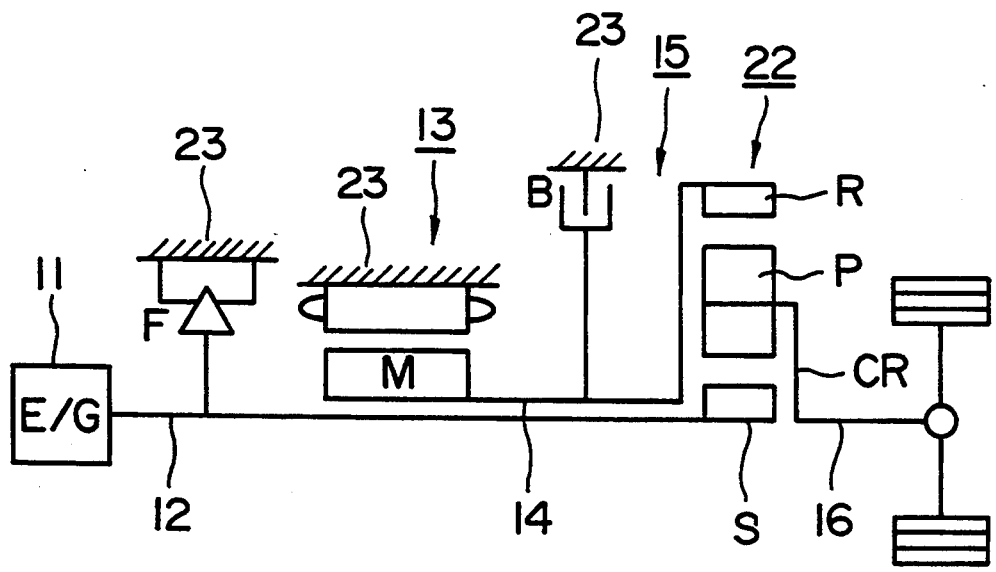
FIG. 13 is a diagrammatic view of the overall structure according to an eighth embodiment.
Figure 14:
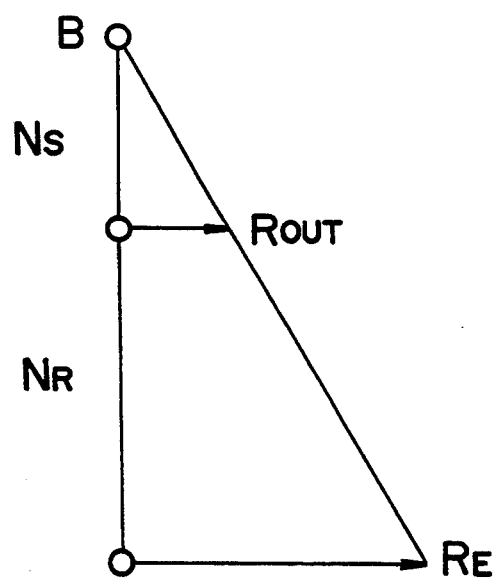
FIG. 14 is a graphical representation of an interrelationship between the rotary speed of the internal combustion engine and the rotary speed of the electric motor in the eighth embodiment.

FIGS. 13 and 14 depict an eighth embodiment according to the present invention.

The overall structure in this embodiment is similar to that of the first embodiment except that a brake device B is provided between the ring gear R and the driving unit case 23, so that the same effects obtained with the embodiments described above and the under-drive cruising of the hybrid vehicle can also be obtained in this eighth embodiment.

However, this embodiment, further provided with the brake device B, offers the further advantage of under-drive cruising of the vehicle when something is wrong with the electric motor 13 or the battery is almost dead.

Figure 15:
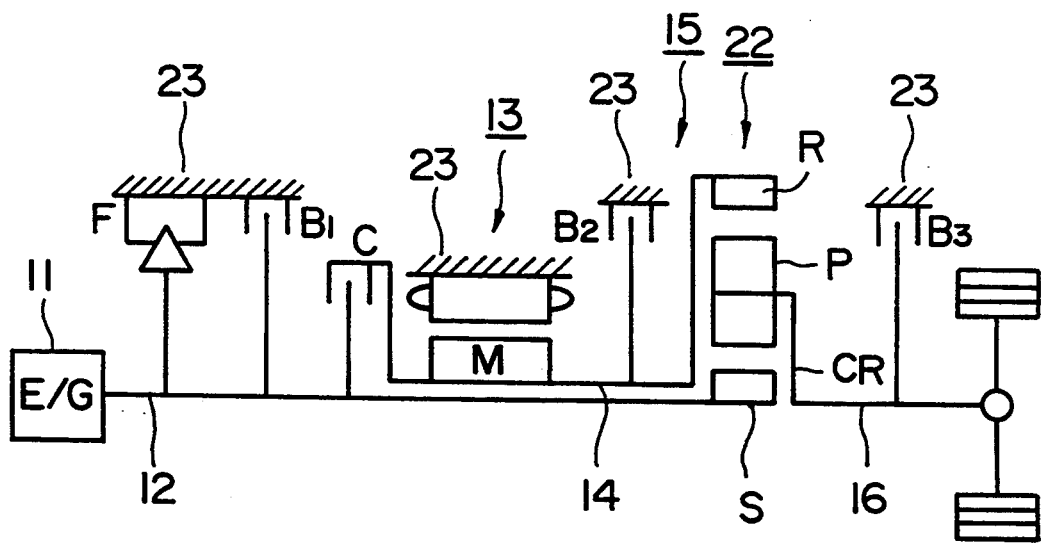
FIG. 15 is a diagrammatic view of the overall structure according to a ninth embodiment.

A ninth embodiment according to the present invention is depicted in FIG. 15 and Table 2.

It will be noted in FIG. 15 that the structure of the ninth embodiment is intended to provide each effect of the above-described embodiments, so that this structure includes every element present in the first, fifth, sixth, seventh and eighth embodiments. Incidentally, there are three brake devices in this embodiment, denoted as B1, B2 and B3.

Accordingly, the same effects obtained with every embodiment described above and the under-drive cruising of the hybrid vehicle can all be achieved in this embodiment.

The operation of this embodiment is shown in Table 2.

TABLE 2

| DRIVING SOURCE | GEAR RATIO | C | B1 | B2 | B3 | F |
|---|---|---|---|---|---|---|
| RUN | | | | | | |
| MOTOR | UNDER DRIVE | X | O | X | X | X | O |
| ENGINE | UNDER DRIVE | X | X | O | X | X |
| E + M* | OCCASIONAL | X | X | X | X | X |
| E* | DIRECT | O | X | X | X | X |
| E + M* | | | | | | |
| MOTOR | REV | X | O | X | X | — |
| STOP | | | | | | |
| E START BY M* | — | X | X | X | O | X |
| M GENERATOR BY E* | — | X | X | X | O | X |
| STOP ON | — | O | X | X | X | O |
| UPHILL | | | | | | |

NOTE:
*E = ENGINE
O = Active State
*M = MOTOR
X = Inactive State

Figure 16:
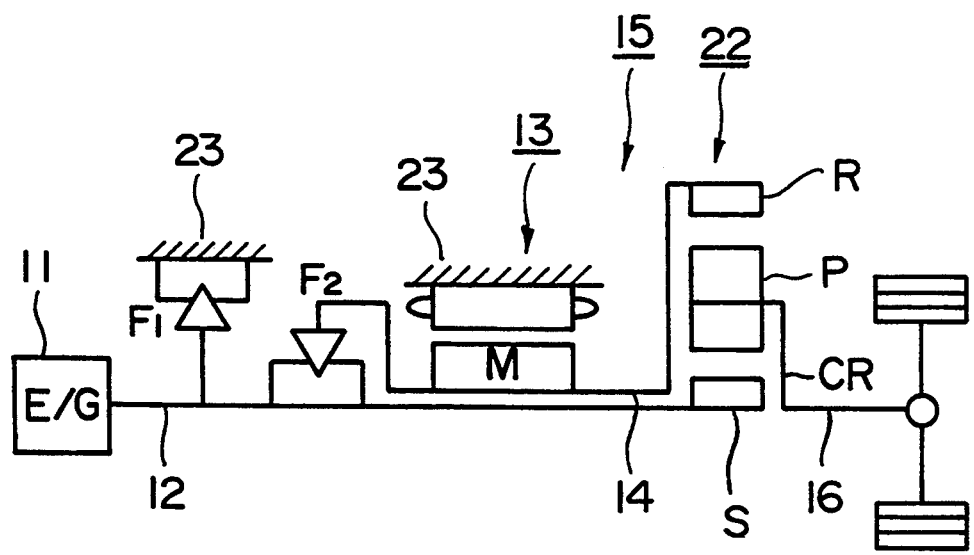
FIG. 16 is a diagrammatic view of the overall structure according to a tenth embodiment.

A tenth embodiment of the present invention is depicted in FIG. 16.

It will be observed that the overall structure of this embodiment is similar to that of the first embodiment except a one-way clutch F2 is provided as a second one-way clutch, in addition to the one-way clutch F1 which is the same as the one-way clutch F used in the first embodiment.

The one-way clutch F2 is provided between the ring gear R and the sun gear S, so that when the rotary speed of the motor $R_M$ is higher than the rotary speed of the engine $R_E$ ($R_M > R_E$), the one-way clutch F2 does not engage. However, if the rotary speed $R_M$ is equal to or less than, the engine rotary speed $R_E$ ($R_M \leq R_E$), the one-way clutch F2 engages.

Figure 17:
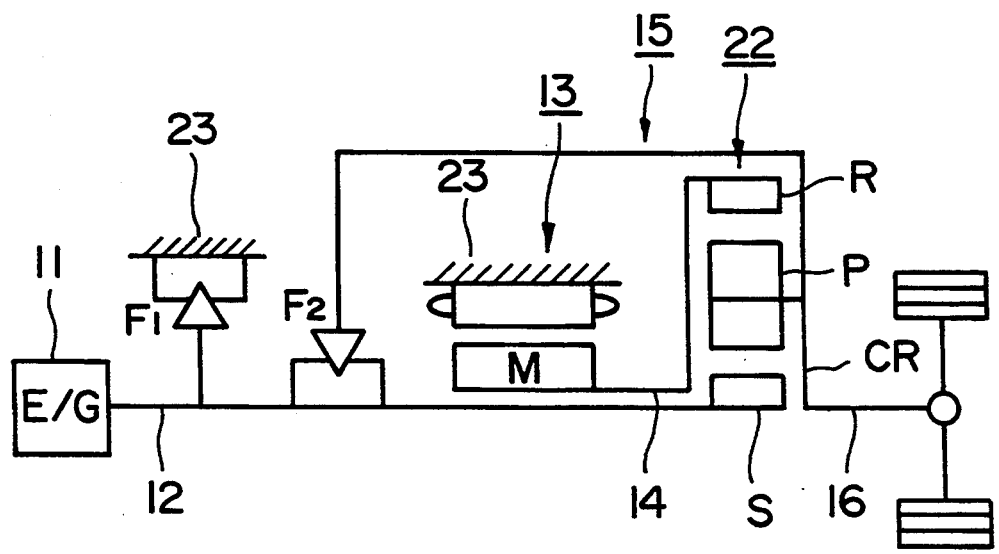
FIG. 17 is a schematic diagram of a first modification of the tenth embodiment.
Figure 18:
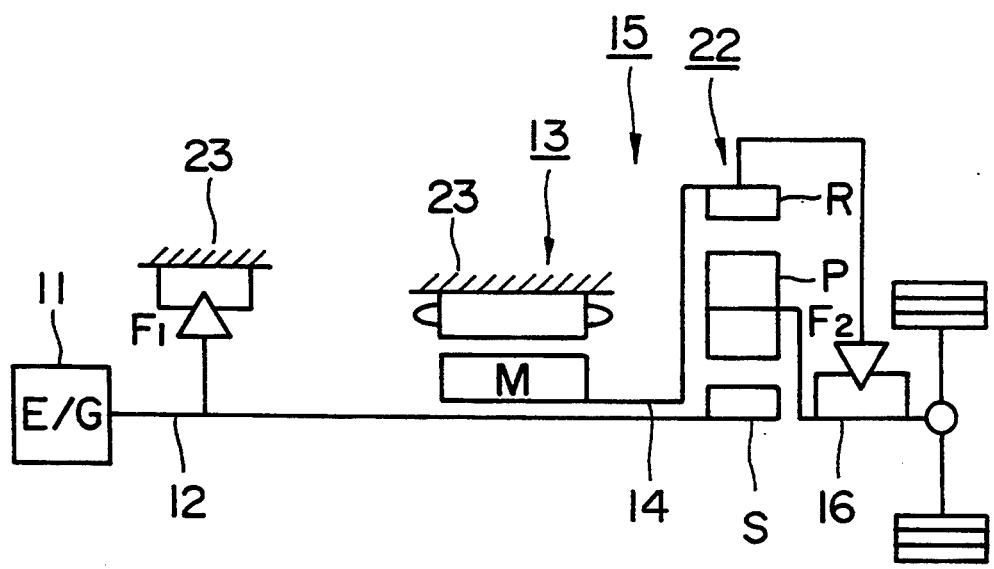
FIG. 18 is a schematic diagram of a second modification of the tenth embodiment.

First and second modifications of the tenth embodiment are respectively depicted in FIGS. 17 and 18. Incidentally, in the description of the following two modifications, the same reference numerals will be used to designate the same or similar components as those in the first embodiment, so that their descriptions will be omitted.

The one-way clutch F2 in the first modification shown in FIG. 17 is provided between the carrier CR and the sun gear S, so that when the output shaft rotary speed $R_{OUT}$ is higher than the engine rotary speed $R_E$ ($R_{OUT} > R_E$), the one-way clutch F2 does not engage. However, if the output shaft rotary speed $R_{OUT}$ is equal to or less than the engine rotary speed $R_E$ ($R_{OUT} \leq R_E$), the one-way clutch F2 engages.

The one-way clutch F2 in the second modification shown in FIG. 18 is provided between the carrier CR and the ring gear R, so that when the output shaft rotary speed $R_{OUT}$ is higher than the engine rotary speed $R_E$ ($R_{OUT} > R_E$), the one-way clutch F2 does not engage. However, if the output shaft rotary speed Rout is equal to or less than the engine rotary speed $R_M$ ($R_{OUT} \leq R_E$), the one-way clutch F2 engages.

Accordingly, the one-way clutch F2 is effective to keep the vehicle on an uphill incline without rolling backward and automatically provides a direct connection between the output shaft 12 of the engine 11 and the output shaft 16 via the transmission unit 22 when operating the engine 11.

Figure 19:
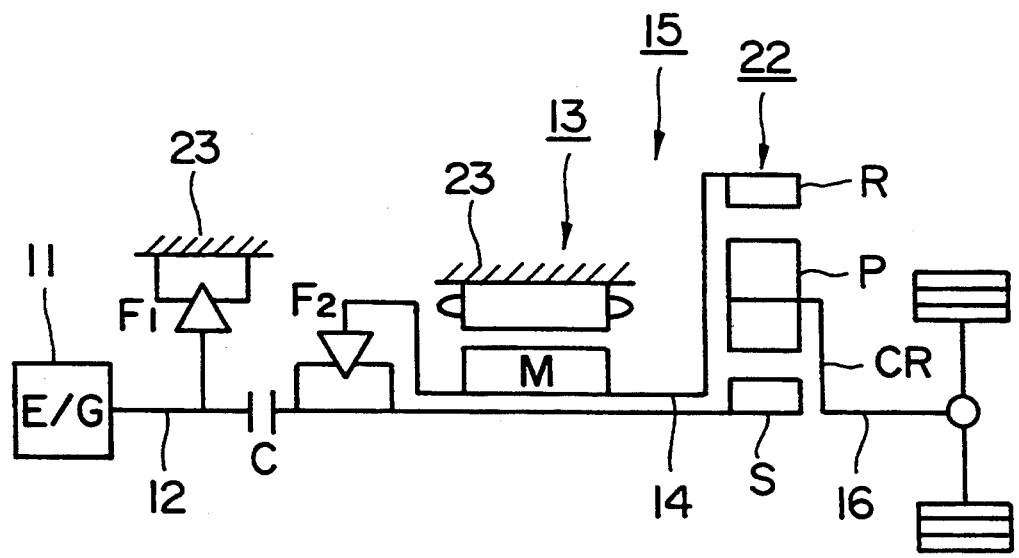
FIG. 19 is a diagrammatic view of the overall structure according to an eleventh embodiment.

An eleventh embodiment of the present invention is depicted in FIG. 19 and the following Table 3.

This embodiment is characterized by the further inclusion of a clutch C between the first one-way clutch and the second one-way clutch.

TABLE 3

| DRIVING SOURCE | GEAR RATIO | C | F1 | F2 |
|---|---|---|---|---|
| RUN | | | | |
| MOTOR | UNDER DRIVE | O | O | X |
| ENGINE | DIRECT | O | X | O |
| E + M* | | | | |
| MOTOR | REV | X | — | O |

TABLE 3-continued

| DRIVING SOURCE | GEAR RATIO | C | F1 | F2 |
| --- | --- | --- | --- | --- |
| STOP ON UPHILL | ○ | | ○ | ○ |

NOTE:
*E = ENGINE
○ = Active State
*M = MOTOR
X = Inactive State

Accordingly, this embodiment provides the same effects described in connection with the tenth embodiment and the two modifications thereof. Furthermore, this structure can drive the vehicle in reverse with the electric motor 13 by releasing the clutch C.

What is claimed is:

1. A hybrid vehicle comprising:
   a casing;
   an internal combustion engine for driving an engine output shaft;
   an electric motor for driving a motor output shaft;
   a transmission housed within said casing and comprising a planetary gear unit, a transmission output shaft and a one-way clutch, said one-way clutch being arranged between said engine output shaft and said casing and permitting rotation of said transmission output shaft in one direction only, said transmission unit receiving as input rotation of said engine output shaft and said motor output shaft at a first rotary speed and outputting rotation through said transmission output shaft at a second rotary speed;
   said planetary gear unit comprising, as three elements thereof, a ring gear, a sun gear and a carrier having at least one pinion, a first of said elements being connected to said engine output shaft, a second of said elements being connected to said motor output shaft and a third of said elements being connected to said transmission output shaft, wherein, in an under-drive cruising state, said first element does not rotate, said second element rotates at a relatively high speed and said third element rotates at a lower speed relative to the high speed rotation of said second element; and
   drive wheels driven by said transmission output shaft.

2. A hybrid vehicle according to claim 1, wherein the first element of the planetary gear unit is the sun gear, the second element of the planetary gear unit is the ring gear, and the third element of the planetary gear unit is the carrier.

3. A hybrid vehicle according to claim 1, wherein the first element of the planetary gear unit is the ring gear, the second element of the planetary gear unit is the sun gear, and the third element of the planetary gear unit is the carrier.

4. A hybrid vehicle according to claim 1, wherein the first element of the planetary gear unit is the sun gear, the second element of the planetary gear unit is the carrier, and the third wherein the carrier has two pinions. element of the planetary gear unit is the ring gear, and 5. A hybrid vehicle according to claim 1, wherein the first element of the planetary gear unit is the carrier, the second element of the planetary gear unit is the sun gear, and the third element of the planetary gear unit is the ring gear, and wherein the carrier has two pinions.

6. A hybrid vehicle according to claim 2, further comprising a first brake between the sun gear and the casing, a clutch between the ring gear and the sun gear, a second brake between the ring gear and the casing, and a third break between the carrier and the casing.

7. A hybrid vehicle according to claim 2 further comprising a brake between said carrier and said casing.

8. A hybrid vehicle according to claim 2 further comprising a clutch between said ring gear and said sun gear.

9. A hybrid vehicle according to claim 2 further comprising a brake between said sun gear and said casing.

10. A hybrid vehicle according to claim 2 further comprising a brake between said ring gear and said casing.

11. A hybrid vehicle according to claim 2 further comprising a additional one-way clutch between said ring gear and said sun gear.

12. A hybrid vehicle according to claim 2 further comprising an additional one-way clutch between said carrier and said sun gear.

13. A hybrid vehicle according to claim 2 further comprising an additional one-way clutch between said carrier and said ring gear.

14. A hybrid vehicle according to claim 11, further comprising a third clutch on said engine output shaft, between the one-way clutches.

* * * * *

UNITED STATES PATENT AND TRADEMARK OFFICE
CERTIFICATE OF CORRECTION

PATENT NO. : 5,433,282
DATED : July 18, 1995
INVENTOR(S) : MOROTO et al

It is certified that error appears in the above-indentified patent and that said Letters Patent is hereby corrected as shown below:

Col. 6, line 39, delete "provided[between" and insert --provided between--.

Col. 8, line 24, delete "than," insert --than--; and
line 47, delete "Rout" insert --$R_{OUT}$--.

Col. 9, Table 3, line 2, "STOP ON UPHILL", under the heading "GEAR RATIO", delete "O" and under the heading "F2" insert --O--.

Col. 10, line 11, after "third" insert --element of the planetary gear unit is the ring gear, and--; and
line 12, delete entire line and insert --ions.--.

UNITED STATES PATENT AND TRADEMARK OFFICE
CERTIFICATE OF CORRECTION

PATENT NO. : 5,433,282
DATED : July 18, 1995
INVENTOR(S) : MOROTO et al

It is certified that error appears in the above-indentified patent and that said Letters Patent is hereby corrected as shown below:

Column 10, line 13, delete entire line.

Signed and Sealed this

Twenty-third Day of April, 1996

Attest:

BRUCE LEHMAN

*Attesting Officer*        *Commissioner of Patents and Trademarks*